(12) United States Patent
Lee et al.

(10) Patent No.: US 8,852,539 B2
(45) Date of Patent: Oct. 7, 2014

(54) SECOND STAGE FISCHER-TROPSCH REACTION SYSTEM TO ENHANCE THE CONVERSION OF SYNTHETIC GAS

(75) Inventors: Ho Tae Lee, Daejeon (KR); Heon Jung, Daejeon (KR); Jung Il Yang, Daejeon (KR); Hak Joo Kim, Daejeon (KR); Dong Hyun Chun, Seoul (KR); Jung Hoon Yang, Daejeon (KR); Ji Chan Park, Daejeon (KR); Byung Kwon Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 218 days.

(21) Appl. No.: 13/516,855

(22) PCT Filed: Jul. 7, 2011

(86) PCT No.: PCT/KR2011/004992
§ 371 (c)(1),
(2), (4) Date: Jun. 18, 2012

(87) PCT Pub. No.: WO2012/133988
PCT Pub. Date: Oct. 4, 2012

(65) Prior Publication Data
US 2012/0275975 A1  Nov. 1, 2012

(30) Foreign Application Priority Data
Apr. 1, 2011 (KR) .................. 10-2011-0030269

(51) Int. Cl.
| | |
|---|---|
| *B01J 8/22* | (2006.01) |
| *B01J 8/00* | (2006.01) |
| *C10G 2/00* | (2006.01) |
| *C01B 3/02* | (2006.01) |

(52) U.S. Cl.
CPC .......... *B01J 8/22* (2013.01); *B01J 2208/00256* (2013.01); *B01J 8/006* (2013.01); *C10J 2300/1659* (2013.01); *Y02E 50/32* (2013.01); *C10G 2/341* (2013.01); *C01B 3/02* (2013.01); *C01B 2203/062* (2013.01); *B01J 2208/00141* (2013.01); *C10G 2/342* (2013.01); *C10G 2/332* (2013.01); *C10G 2300/1022* (2013.01); *B01J 2219/0004* (2013.01)
USPC .......... 422/634; 422/639; 422/641; 422/649; 518/706; 518/707

(58) Field of Classification Search
CPC ........................................... C10G 2/341–2/344
USPC .......... 422/634, 639, 641, 649; 518/706, 707
See application file for complete search history.

(56) References Cited

U.S. PATENT DOCUMENTS

| | | | | |
|---|---|---|---|---|
| 2,417,164 A | * | 3/1947 | Huber, Jr. et al. | 518/707 |
| 2,434,537 A | * | 1/1948 | Barr et al. | 518/706 |

(Continued)

FOREIGN PATENT DOCUMENTS

| | | |
|---|---|---|
| KR | 10-0986751 B1 | 10/2010 |
| WO | WO 2007/069317 A1 | 6/2007 |

*Primary Examiner* — Lessanework Seifu
(74) *Attorney, Agent, or Firm* — Rabin & Berdo, P.C.

(57) ABSTRACT

A second stage Fischer-Tropsch reaction system to enhance a conversion ratio of a synthetic gas, includes, at least one first reactor that uses a Fe catalyst, receives a first synthetic gas extracted from a coal, biomass or natural gas, and reacts the first synthetic gas with the Fe catalyst to obtain a synthetic fuel, and a second reactor that uses a Fe.Co or Co catalyst, receives a second synthetic gas discharged from the first reactors after reaction, and reacts the second synthetic gas with the Fe.Co or Co catalyst to obtain a synthetic fuel.

7 Claims, 2 Drawing Sheets

(56) References Cited

U.S. PATENT DOCUMENTS

| | | |
|---|---|---|
| 4,912,259 A | 3/1990 | Kaneko et al. |
| 5,324,335 A | 6/1994 | Benham et al. |
| 5,500,449 A | 3/1996 | Benham et al. |
| 5,504,118 A | 4/1996 | Benham et al. |
| 5,506,272 A | 4/1996 | Benham et al. |
| 5,543,437 A | 8/1996 | Benham et al. |
| 5,620,670 A | 4/1997 | Benham et al. |
| 5,621,155 A | 4/1997 | Benham et al. |
| 5,645,613 A | 7/1997 | Benham et al. |
| 5,763,716 A | 6/1998 | Benham et al. |
| 6,169,120 B1 * | 1/2001 | Beer .................. 518/715 |
| 6,642,281 B1 | 11/2003 | Long et al. |
| 8,057,744 B2 | 11/2011 | Onishi et al. |
| 2009/0220389 A1 | 9/2009 | Onishi et al. |

\* cited by examiner

SECOND STAGE FISCHER-TROPSCH REACTION SYSTEM TO ENHANCE THE CONVERSION OF SYNTHETIC GAS

TECHNICAL FIELD

The present invention relates to a second stage Fischer-Tropsch reaction system for producing a synthetic gas through Fischer-Tropsch reaction with a catalyst contained in a slurry (oil, wax) in coal to liquids (CTL) and gas to liquids (GTL) processes. More specifically, the present invention relates to a second stage Fischer-Tropsch reaction system to enhance a conversion ratio of synthetic gas, that comprises a first reactor including a bubble column reactor and a second reactor including a bubble column reactor or a fixed bed reactor, and separates moisture and an oil with a low melting point using two heat exchangers mounted between the two reactors, to maximize a yield of a synthetic fuel and lengthen the lifespan of catalyst used.

BACKGROUND ART

In general, an F-T reaction process is a key process of such as coal-to-liquids (coal indirect liquefaction system, CTL), gas-to-liquids (GTL), and X-to-liquids (XTL) in which oils are produced by gasifying biomass such as wood and various materials such as wastes.

Here, a ratio of hydrogen and carbon monoxide ($H_2/CO$) that are generated in the gasification of CTL, GTL and XTL processes may be variously distributed depending on raw materials. When a solid such as coal, petroleum coke, heavy residues and biomass such as wood is used as a raw material, the content thereof is about 0.6 to about 1.2, and when a gas such as natural gas and process waste gas is used as a raw material, the content thereof is 1.2 to 2.0.

In the F-T reaction process, a synthetic gas ($CO+H_2$) is incorporated into a reactor and reacts with a catalyst contained in a body of the reactor to produce a liquid synthetic material.

At this time, the catalyst used for the F-T reactor is generally an iron (Fe) or cobalt (Co) catalyst. The type of catalyst used for the F-T reactor depends on a ratio of the synthetic gas ($H_2/CO$) incorporated into the reactor.

The Fe catalyst can be used in a wide $H_2/CO$ ratio range of 0.6 to 3.5 since the components contained in the catalyst induce a water gas shift reaction to convert CO into hydrogen. However, the Fe catalyst has lower activity than the Co catalyst. In order to impart a high activity to the Fe catalyst, reaction temperature and pressure are inevitably increased and, as a result, the lifespan of catalyst is shortened.

On the other hand, the cobalt catalyst has a high activity, thus having low reaction temperature and pressure, as compared to the Fe catalyst. Unless the $H_2/CO$ ratio of the cobalt catalyst is maintained at 1.8 to 2.0, inactivation of the catalyst is accelerated and the lifespan of catalyst is shortened. Accordingly, when the Co catalyst is for coal liquation process, a $H_2/CO$ ratio of synthetic gas incorporated into the F-T reactor should be maintained at 1.8 to 2.0 by adhering a hydrogen gas reactor to the front surface of the F-T reactor. In addition, the Co catalyst disadvantageously undergoes rapid deterioration in reaction activity, although a small amount of impurity such as $H_2S$ is contained in the synthetic gas, thus being unsuitable for application to the synthetic gas produced from coals.

As such, each of Fe and Co catalysts has advantages and disadvantages. For this reason, there is a need for development of combination of reaction process to supplement advantages and disadvantages and improve efficiency.

DISCLOSURE

Technical Problem

Therefore, the present invention has been made in view of the above problems, and it is one object of the present invention to provide a second stage Fischer-Tropsch reaction system to enhance a conversion ratio of synthetic gas in which a first reactor 10 that generally uses a Fe catalyst is connected to a second reactor 20 that generally uses a Fe.Co or Co catalyst to form two reaction regions, different catalysts and reaction conditions are imparted to the reaction regions to increase a total conversion ratio of the synthetic gas, to maximize a yield of synthetic material and thereby to lengthen a lifespan of catalyst.

It is another object of the present invention to provide a second stage Fischer-Tropsch reaction system to enhance a conversion ratio of a synthetic gas in which the conversion ratio of CO is controlled by controlling the temperature and pressure of the first reactor, and flow of synthetic gas incorporated into the first reactor, and, as a result, reaction conditions suitable for the second reactor can be provided by adjusting the $H_2/CO$ ratio of the gas incorporated into the second reactor to 1.8 to 2.0.

It is another object of the present invention to provide a second stage Fischer-Tropsch reaction system to enhance a conversion ratio of synthetic gas in which incorporation of impurities into the second reactor can be minimized by removing moisture and an oil with a low boiling point contained in the synthetic gas discharged from the first reactor using a first heat exchanger, and, furthermore, energy efficiency can be improved and reaction efficiency can be maximized by heating the synthetic gas incorporated into the second reactor using heat generated in the first reactor and the second reactor.

Technical Solution

In accordance with one aspect of the present invention, provided is a second stage Fischer-Tropsch reaction system to enhance a conversion ratio of a synthetic gas, including: at least one first reactor that uses a Fe catalyst, receives a first synthetic gas extracted from a coal, biomass or natural gas, and reacts the first synthetic gas with the Fe catalyst to obtain a synthetic fuel; and a second reactor that uses a Fe.Co or Co catalyst, receives a second synthetic gas discharged from the first reactors after reaction, and reacts the second synthetic gas with the Fe.Co or Co catalyst to obtain a synthetic fuel, wherein the first reactor receives the first synthetic gas having a $H_2/CO$ ratio of 0.6 to 1.2, and controls the internal temperature, pressure, and superficial gas flow rate of the first synthetic gas to adjust a CO conversion ratio during reaction to 50 to 80%, and the second reactor receives the second synthetic gas having a $H_2/CO$ ratio of 1.8 to 2.0 discharged from the first reactor after reaction, and controls the internal temperature, pressure, and superficial gas flow rate of the first synthetic gas to adjust a CO conversion ratio during reaction to 90 to 95%.

Preferably, the first reactor and the second reactor are bubble column reactors.

Preferably, the first reactor is a bubble column reactor and the second reactor is a fixed bed reactor having a catalyst pipe containing a catalyst.

Preferably, the first reactor includes a first cooling pipe to prevent a rapid increase in temperature caused by reaction heat generated during reaction of the Fe catalyst, and the second reactor includes a second cooling pipe to prevent a rapid increase in temperature caused by reaction heat generated during reaction of the Fe.Co or Co catalyst, wherein the second stage Fischer-Tropsch reaction system further includes: a connection line that connects an outlet pipe of the first reactor to an inlet pipe of the second reactor, to receive the second synthetic gas discharged from the first reactor after reaction and react the second synthetic gas with the Fe.Co or Co catalyst stored in the second reactor; a first heat exchanger mounted on the connection line to cool the second synthetic gas discharged from the first reactor after reaction, and collect water and an oil with a low melting point contained in the second synthetic gas through the first collection tank; and a second heat exchanger connected to the connection pipe, to heat the second synthetic gas cooled through the first heat exchanger to a reaction temperature of the Fe.Co or Co catalyst of the second reactor.

Preferably, the second stage Fischer-Tropsch reaction system further includes: a first line that connects the first heat exchanger to the inlet of the first cooling pipe, wherein the first line has a configuration in which cooling water supplied to the first heat exchanger cools the second synthetic gas discharged from the first reactor after reaction, and, continuously, the cooling water is delivered to the first cooling pipe and cools the inside of the first reactor to prevent a rapid increase in temperature caused by the internal reaction heat; a second line that connects the outlet of the first cooling pipe to the second heat exchanger, wherein the second line has a configuration in which high-temperature cooling water discharged through the outlet of the first cooling pipe is supplied to the second heat exchanger and heats the second synthetic gas cooled through the first heat exchanger, and the high-temperature cooling water is then discharged in the form of water or steam and is used as another heat source; and a third line that connects the outlet of the second cooling pipe to the second line, wherein the third line has a configuration in which high-temperature cooling water discharged through the outlet of the second cooling pipe is supplied to the second line to increase the temperature of cooling water incorporated into the second heat exchanger along the second line.

Preferably, the second stage Fischer-Tropsch reaction system further includes:

a third heat exchanger that cools a third synthetic gas discharged from the second reactor after reaction, collects water and an oil with a low melting point contained in the synthetic gas through the second collection tank and stores the same, wherein the third heat exchanger is mounted on the discharge line connected to the second reactor.

Preferably, the second stage Fischer-Tropsch reaction further includes: a fourth line that connects the third heat exchanger to the inlet of the second cooling pipe, wherein the fourth line has a configuration in which cooling water supplied to the third heat exchanger cools the third synthetic gas discharged from the second reactor, and, continuously, is delivered to the second cooling pipe to prevent a rapid increase in an inter temperature of the second reactor.

Preferably, regarding reaction conditions of the first reactor, an internal temperature is 240° C. to 280° C., an internal pressure is 15 to 40 atm, and a superficial gas flow rate of the incorporated first synthetic gas is 5 to 20 cm/sec.

Preferably, regarding reaction conditions of the second reactor, a temperature is 150° C. to 230° C., a pressure is 10 to 30 atm, and a superficial gas flow rate of the incorporated first synthetic gas is 5 to 20 cm/sec.

Advantageous Effects

The second stage Fischer-Tropsch reaction system to enhance a conversion ratio of synthetic gas according to the present invention is effective in that activity of catalyst can be maintained for a long period of time by providing two independent reactors, selecting a catalyst suitable for the $H_2/CO$ ratio of synthetic gas and maintaining process conditions suitable for respective characteristics, and economic efficiency of process can be improved by maximizing yield of the synthetic fuel.

In addition, the second stage Fischer-Tropsch reaction system is effective in that incorporation of impurities into the second reactor can be minimized by removing moisture and an oil with a low boiling point contained in a synthetic gas discharged from the first reactor using a first heat exchanger, and, furthermore, energy efficiency can be improved and reaction efficiency can be maximized by heating the synthetic gas incorporated into the second reactor using heat generated in the first reactor and the second reactor.

BRIEF DESCRIPTION OF THE DRAWINGS

The above and other objects, features and other advantages of the present invention will be more clearly understood from the following detailed description taken in conjunction with the accompanying drawings, in which.

BEST MODE

Hereinafter, a second stage Fischer-Tropsch reaction system to enhance a conversion ratio of synthetic gas according to the present invention will be described in more detail with reference to the annexed drawings.

Embodiment 1

Figure 1:
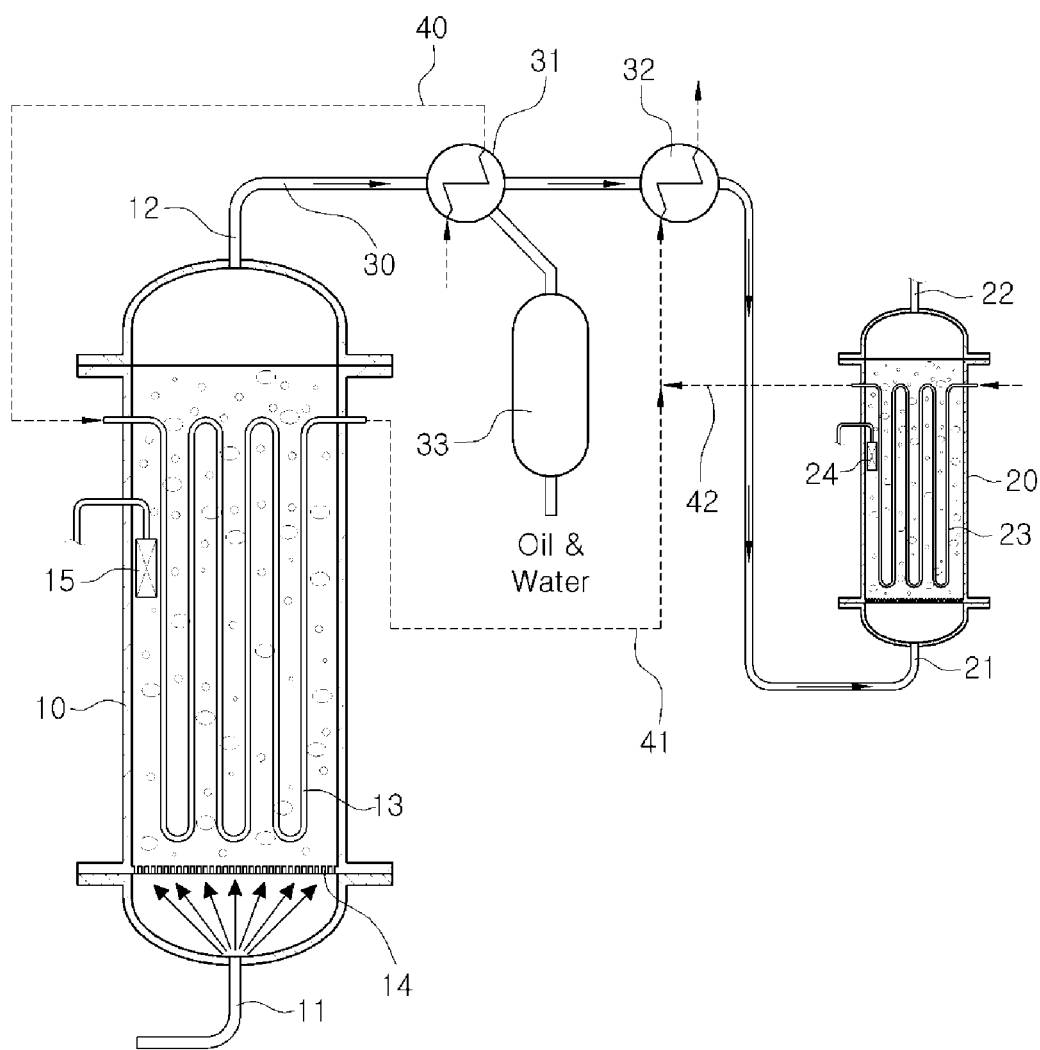
FIG. 1 is a view illustrating the configuration of a second stage Fischer-Tropsch reaction system to enhance a conversion ratio of a synthetic gas according to a first embodiment of the present invention.

FIG. 1 is a view illustrating the configuration of a second stage Fischer-Tropsch reaction system to enhance a conversion ratio of a synthetic gas according to a first embodiment of the present invention.

As shown in FIG. 1, the present invention relates to a second stage Fischer-Tropsch reaction system to enhance a conversion ratio of synthetic gas in which a first reactor that generally uses a Fe catalyst is connected to a second reactor 20 that generally uses a Fe.Co or Co catalyst to form two reaction regions, different catalysts and reaction conditions are imparted to the reaction regions to increase a total conversion ratio of the synthetic gas, maximize a yield of synthetic material and lengthen a lifespan of catalyst.

The second stage Fischer-Tropsch reaction to enhance a conversion ratio of synthetic gas according to the present invention are largely divided into two components, that is, a first reactor 10 and a second reactor 20 connected to the first reactor 10.

Here, the first reactor includes a bubble column reactor in which a slurry containing a Fe catalyst is stored.

The first reactor 10 is provided at the bottom thereof with a dispersion plate 14 to disperse bubble particles of a first synthetic gas extracted from coals, is provided at the internal and central region thereof with a filter 15 to discharge a synthetic fuel generated by Fischer-Tropsch reaction between the first synthetic gas and the Fe catalyst and filter the catalyst, and is provided with an internal region thereof with a first cooling pipe 13 to cool reaction heat generated by the Fischer-Tropsch reaction therebetween.

The first reactor 10 receives a first synthetic gas through an inlet tube 11. At this time, a ratio of $H_2$ and CO contained in the first synthetic gas is 0.6 to 1.2, and a CO conversion ratio in the reaction of Fe catalyst is adjusted to 50 to 80% by controlling internal temperature, pressure and superficial gas flow rate of the first synthetic gas.

At this time, regarding reaction conditions, it is required that, for a total composition ratio of the first synthetic gas, $H_2$ be 35% to 40%, CO be 40% to 45%, $CO_2$ be 10% to 20%, and $CH_4$ be 1% to 5%, and an internal temperature be 240° C. to 280° C., an internal pressure be 15 to 40 atm, and a superficial gas flow rate be 5 to 20 cm/sec.

In particular, the first reactor 10 has a lower activity than a Co catalyst since it uses a Fe catalyst. Accordingly, in order to obtain high activity, reaction temperature should be increased. When the reaction temperature is excessively high, lifespan of Fe catalyst is shortened. Accordingly, the reaction temperature of the first reactor 10 is maintained at 240° C. to 280° C., internal pressure is maintained at 15 to 40 atm, and a superficial gas flow rate is adjusted to 5 to 20 cm/sec, thereby adjusting a conversion ratio of CO within a range of 50 to 80%.

As a result, a $H_2$/CO ratio of the second synthetic gas incorporated into the second reactor 20 after reaction is maintained at 1.8 to 2.0, and reacts with a Fe.Co or Co catalyst contained in the second reactor 20, thereby increasing a conversion ratio of CO in the second reactor 20 to 90% to 95%.

Meanwhile, the Fischer-Tropsch reaction scheme of the present invention is defined as Formula 1 below and is a major reaction scheme of the first reactor 10 and the second reactor 20.

$$nCO+2nH_2 => (CH_2)_n + nH_2O \qquad (1)$$

A side reaction (hydrogen gas reaction) scheme of the first reactor 10 is shown in Formula 2 below.

$$nH_2O + nCO => nCO_2 + nH_2 \qquad (2)$$

The reactions shown in [Formula 1] and [Formula 2] are generated in the first reactor 10 that uses a Fe catalyst, and a CO conversion ratio is maintained at 50 to 80% according to the composition ratio of the first synthetic gas according to the composition ratio, superficial gas flow rate, internal temperature and internal pressure of the first synthetic gas, thereby adjusting a $H_2$/CO ratio of the second synthetic gas supplied to the second reactor 20 to 1.8 to 2.0.

In addition, a wax-form synthetic fuel can be primarily obtained in the first reactor 10 through a filter by reaction of the Fe catalyst in accordance with [Formula 1] in a state in that the CO conversion ratio is 50 to 80%.

Also, a side reaction scheme of the first synthetic gas and the second synthetic gas is shown in [Formula 3].

$$3nH_2 + nCO => nCH_4 + nH_2O \qquad \text{[Formula 3]}$$

This [Formula 3] frequently occurs when reaction temperature is maintained to a high level. In particular, when generation of a methane gas increases, process efficiency is disadvantageously deteriorated.

Meanwhile, the following side reaction [Formula 4] may occur when a second synthetic gas having a $H_2$/CO ratio of 1.8 or less is incorporated into the second reactor 20 using a Fe.Co catalyst or a Co catalyst, or generation of a great amount of methane gas and thus lack of hydrogen amount are caused due to excessively high temperature.

$$H_2 + CO => C + H_2O \qquad \text{[Formula 4]}$$

Such a reaction causes production of carbon and the carbon is covered with the surface of catalyst, thus disadvantageously facilitating inactivation and decreasing a CO conversion ratio, thereby decreasing yield of a synthetic fuel from the second synthetic gas.

Meanwhile, the second reactor 20 uses a Fe.Co or Co catalyst and is provided with a second cooling pipe 23 to remove reaction heat generated during reaction between the second synthetic gas and the catalyst.

The second reactor 20 includes a bubble column reactor or a fixed bed reactor having a catalyst pipe containing a catalyst. In this embodiment of the present invention, an example of the bubble column reactor will be described with reference to the drawings.

As described in the first reactor 10 above, the second reactor 20 maintains a CO conversion ratio at 50 to 80%, thus receiving a second synthetic gas having a $H_2$/CO ratio of 1.8 to 2.0. Also, regarding a total composition ratio of the second synthetic gas, $H_2$ is 40% to 50%, CO is 20 to 30%, $CO_2$ is 20% to 40%, and $CH_4$ is 2% to 7%.

Regarding the reaction conditions of the second reactor 20, a temperature is 150° C. to 230° C., a pressure is to 30 atm, and a superficial gas flow rate of incorporated first synthetic gas is 5 to 20 cm/sec.

The second reactor 20 is connected to the first reactor 10 and receives the second synthetic gas from the first reactor 10, a small amount of impurities contained in the first synthetic gas is removed during the reaction with the Fe catalyst in the first reactor 10, or absorbed in the slurry, removed in a state that it is contained in an oil and water condensed in the first heat exchanger 31. For this reason, incorporation of impurities into the second reactor 20 can be prevented and a substance inhibiting activity of the Co catalyst is not supplied to the second reactor 20 and the lifespan of Co catalyst can be lengthened.

The second synthetic gas having a $H_2$/CO ratio of 1.8 to 2.0 is supplied to the second reactor 20 and can be reacted under the aforementioned conditions such that a CO conversion ratio reaches 90% to 95%, thus obtaining an overall yield of 95% or higher and improving an economic efficiency of process.

In addition, the present invention includes a first heat exchanger 31 to cool a synthetic gas discharged through an outlet pipe 12 of the first reactor 10 from an internal region of the first reactor 10, and a second heat exchanger 32 to perform heating using a reaction heat of the first reactor 10 to heat the synthetic gas cooled through the first heat exchanger 31.

A connection line 30 that connects the outlet pipe 12 of the first reactor 10 to the inlet pipe 21 of the second reactor 20 is provided to enable the second synthetic gas supplied from the first reactor 10 to react with a Fe.Co or Co catalyst in the second reactor 20.

The connection line 30 is provided with a first heat exchanger 31 that cools the second synthetic gas supplied from the first reactor 10, collects water and an oil with a low melting point contained in the second synthetic gas through a first collection tank 33 and stores the same.

That is, the first heat exchanger 31 cools a high-temperature second synthetic gas delivered along the connection line 30, collects water and an oil with a low melting point contained in the second synthetic gas through the first collection tank 33, and has a structure capable of preventing supply of moisture that inhibits activity of co catalyst of the second reactor 20.

In addition, the connection line 30 is provided with a second heat exchanger 32 to heat the second synthetic gas cooled through the first heat exchanger 31 to a reaction temperature of a Fe.Co or Co catalyst of the second reactor 20.

Meanwhile, a first line 40 connects the first heat exchanger 31 to an inlet side of the first cooling pipe 13. The first line 40 has a configuration in which cooling water supplied from the first heat exchanger 31 cools the second synthetic gas discharged from the first reactor 10 after reaction and delivers the second synthetic gas to the first cooling pipe 13 to cool the first reactor 10 heated by the reaction heat and thereby prevent rapid elevation in temperature caused by the internal reaction heat.

In addition, the second heat exchanger 32 is connected to the outlet side of the first cooling pipe 13 through a second line 41. The second line 41 has a configuration in which high-temperature cooling water discharged through the outlet of the first cooling pipe is supplied to the second heat exchanger and heats the second synthetic gas cooled through the first heat exchanger, and the high-temperature cooling water is then discharged in the form of water or steam and is used as another heat source.

In addition, the reaction system further comprises a third line 42 that connects the outlet side of the second cooling pipe 23 to the second line 41. The third line 42 supplies high-temperature cooling water discharged through the outlet side of the second cooling pipe 23 to the second line 41 and allows cooling water incorporated into the second heat exchanger 32 along the second line 41 to be heated.

Hereinafter, action of the second stage Fischer-Tropsch reaction system to enhance a conversion ratio of a synthetic gas will be described in brief with reference to FIG. 1.

As shown in FIG. 1, a first synthetic gas is incorporated into an inlet pipe 11 of the first reactor 10. The incorporated first synthetic gas uniformize bubble particles while passing through the dispersion plate 14 and then reacts with the Fe catalyst to produce a synthetic fuel.

The produced synthetic fuel is collected through the filter 15, a high-temperature second synthetic gas supplied through the connection line 30 after reaction is cooled through the first heat exchanger 31, and water and an oil with a low melting point contained in the second synthetic gas are collected through the first collection tank 33. This aims to prevent moisture incorporated into the second reactor 20 from inhibiting activity of the Co catalyst.

The low-temperature second synthetic gas in which moisture and an oil having a low melting point are removed is heated through the second heat exchanger 32 again and is incorporated into the second reactor 20.

Furthermore, the second synthetic gas incorporated into the second reactor 20 reacts with a Fe.Co or Co catalyst, the synthetic fuel is collected through the filter 24 provided in the second reactor 20 and gas produced during reaction and unreacted gas are discharged outside.

A movement route of cooling water is as follows.

First step: original low-temperature cooling water is supplied to the first heat exchanger 31, cools a second synthetic fuel and is discharged through the first line 40.

Second step: cooling water that cools the second synthetic fuel is incorporated into the first cooling pipe 13 along the first line 40, cools reaction heat of the first reactor 10, is converted into high-temperature cooling water and is then discharged through the second line 41.

Third step: separate cooling water that cools reaction heat of the second reactor 20 and is converted into a high-temperature cooling water is discharged through the third line 42 and joined to cooling water of the second line 41.

Fourth step: the joined high-temperature cooling water is supplied to the second heat exchanger 32 through the second line 41, heats the second synthetic fuel and then converted into steam and is used as another heat source.

Embodiment 2

Figure 2:
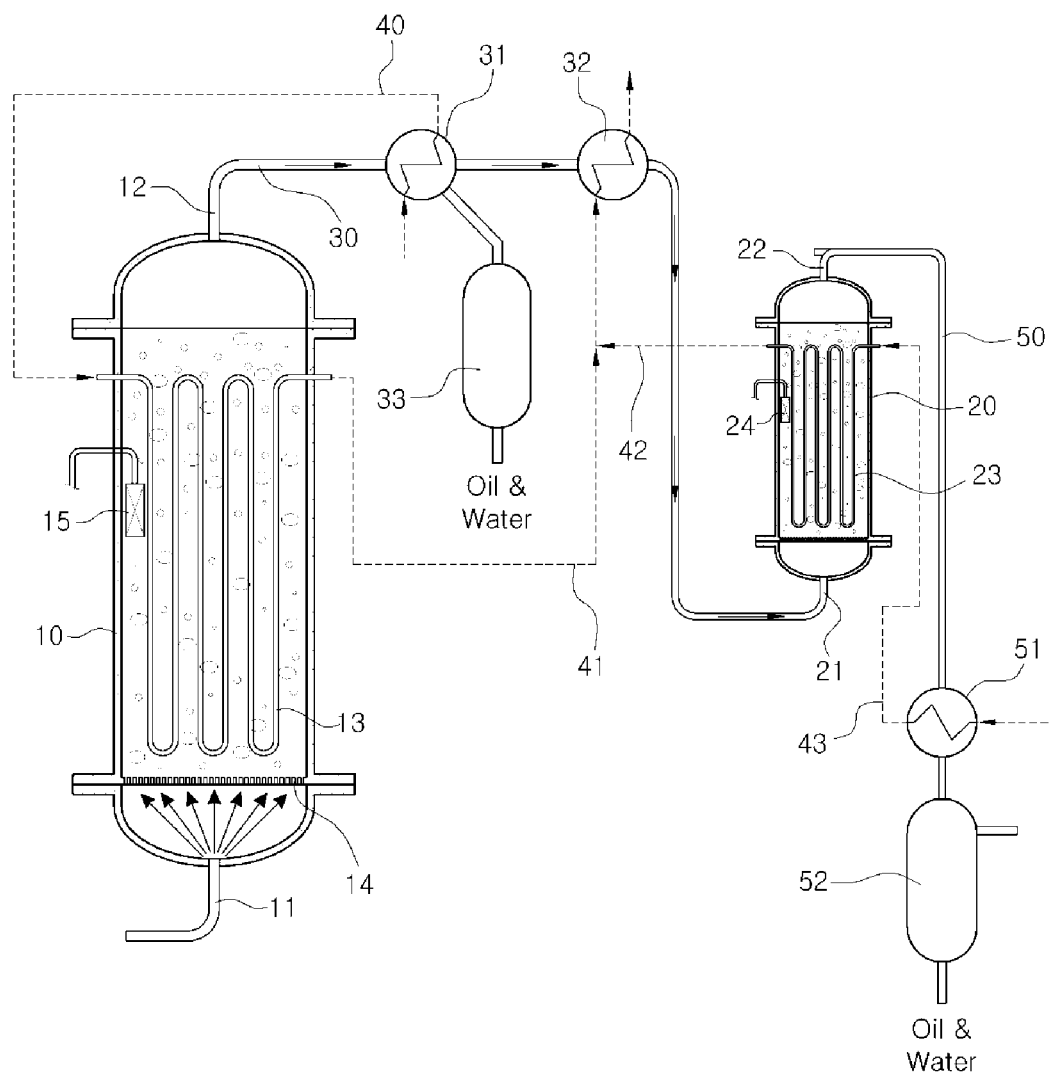
FIG. 2 is a view illustrating the configuration of a second stage Fischer-Tropsch reaction system to enhance a conversion ratio of a synthetic gas according to a second embodiment of the present invention.

FIG. 2 is a view illustrating a configuration of a second stage Fischer-Tropsch reaction system to enhance a conversion ratio of a synthetic gas according to a second embodiment of the present invention.

As shown in FIG. 2, the second embodiment includes the first embodiment and further includes a third heat exchanger that cools a third synthetic gas discharged from the second reactor 20 after reaction, collects water and an oil with a low melting point contained in the third synthetic gas through a second collection tank 52 and stores the same.

In this embodiment, the second reactor 20 includes a bubble column reactor and the third heat exchanger 51 is provided in a discharge line 50 connected to the outlet pipe 22 of the second reactor 20.

The second embodiment further includes a fourth line 43 that connects the third heat exchanger 51 to the inlet side of the second cooling pipe 23. The fourth line 43 has a configuration in which cooling water supplied from the third heat exchanger 51 cools the third synthetic gas discharged from the second reactor 20, is continuously delivered to the second cooling pipe 23 and prevents rapid increase in internal temperature in the second reactor 20 caused by the reaction heat.

Based on this structure, low-temperature cooling water is supplied to the third heat exchanger 51, water or an oil with a low melting point of a third synthetic gas discharged through the discharge line 50 is collected through a second collection tank 52, and an unreacted gas is discharged outside.

In addition, high-temperature cooling water discharged through the second cooling pipe 23 is joined in the second line 41 through the third line 42 and heats the second synthetic gas through the second heat exchanger 32.

The volume of the second reactor 20 according to the present invention is proportion to the number of the first reactor 10 and a CO conversion ratio of the first reactor. For example, when the number of the first reactors 10 is one like the Embodiment, the volume of the second reactor 20 is 30 to 60% of the first reactor 10. Accordingly, when the number of first reactors 10 is two, the volume of the second reactor 20 may be 60% to 120% of that of the first reactor 10.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A second stage Fischer-Tropsch reaction system to enhance a conversion ratio of a synthetic gas, comprising:
at least one first reactor for obtaining a synthetic fuel by reacting a Fe catalyst with a first synthetic gas extracted from a coal, biomass or natural gas, each first reactor including a first cooling pipe thereinside for preventing a rapid increase in temperature caused by heat generated during a reaction in the first reactor, wherein the first reactor receives the first synthetic gas having a H2/CO ratio of 0.6 to 1.2 and controls a CO conversion ratio in a range of 50 to 80% during the reaction by adjusting temperature and pressure of the first reactor and a superficial gas flow rate of the first synthetic gas;

a second reactor for obtaining the synthetic fuel by reacting a Fe—Co or Co catalyst with a second synthetic gas discharged from the first reactors after the reaction, the second reactor including a second cooling pipe thereinside for preventing a rapid increase in temperature caused by heat generated during a reaction in the second reactor, wherein the second reactor receives the second synthetic gas having a H2/CO ratio of 1.8 to 2.0 discharged from the first reactor and controls the CO conversion ratio in a range of 90 to 95% by adjusting temperature and pressure of the second reactor and a superficial gas flow rate of the second synthetic gas;

a connection line connecting an outlet pipe of the first reactor and an inlet pipe of the second reactor and conveying the second synthetic gas to the second reactor for reacting with the Fe.Co or Co catalyst stored in the second reactor;

a first heat exchanger mounted on the connection line and collecting water and oil with a low melting point contained in the second synthetic gas into a first collection tank by cooling the second synthetic gas; and a second heat exchanger mounted on the connection pipe and heating the second synthetic gas cooled by the first heat exchanger upto a reaction temperature of the Fe.Co or Co catalyst;

a first line connecting the first heat exchanger and an inlet of the first cooling pipe and conveying first cooling water supplied to the first heat exchanger for cooling the second synthetic gas to the first cooling pipe for cooling an inside of the first reactor;

a second line connecting an outlet of the first cooling pipe and the second heat exchanger and conveying the first cooling water heated in and discharged from the first cooling pipe to the second heat exchanger for heating the second synthetic gas cooled in the first heat exchanger, the first cooling water in the second line being discharged in a form of water or steam to be used as another heat source; and a third line connecting an outlet of the second cooling pipe and the second line and conveying second cooling water discharged from the outlet of the second cooling pipe to the second line for increasing temperature of the first cooling water flowing into the second heat exchanger along the second line.

2. The second stage Fischer-Tropsch reaction system according to claim 1, wherein the first reactor and the second reactor are bubble column reactors.

3. The second stage Fischer-Tropsch reaction system according to claim 1, wherein the first reactor is a bubble column reactor and the second reactor is a fixed bed reactor having a catalyst pipe containing a catalyst.

4. The second stage Fischer-Tropsch reaction system according to claim 1, further comprising:

a third heat exchanger that cools a third synthetic gas discharged from the second reactor, collects water and oil with a low melting point contained in the third synthetic gas into a second collection tank, wherein the third heat exchanger is mounted on a discharge line connected between the second reactor and the second collection tank.

5. The second stage Fischer-Tropsch reaction according to claim 4, further comprising:

a fourth line connecting the third heat exchanger and an inlet of the second cooling pipe, wherein the second cooling water supplied to the third heat exchanger cools the third synthetic gas discharged from the second reactor and is delivered to the second cooling pipe to prevent a rapid increase in an inter temperature of the second reactor.

6. The second stage Fischer-Tropsch reaction according to claim 1, wherein the first reactor adjusts the temperature of the first reactor in a rage of 240° C. to 280° C., the pressure of the first reactor in a rage of 15 to 40 atm, and the superficial gas flow rate of the first synthetic gas in a rage of 5 to 40 cm/sec.

7. The second stage Fischer-Tropsch reaction according to claim 1, wherein the second reactor adjusts the temperature of the second reactor in a rage of 150° C. to 230° C., the pressure of the second reactor in a rage of 10 to 30 atm, and the superficial gas flow rate of the second synthetic gas in a rage of 5 to 20 cm/sec.

* * * * *